(12) United States Patent
Webb et al.

(10) Patent No.: US 6,934,916 B1
(45) Date of Patent: Aug. 23, 2005

(54) METHOD AND APPARATUS FOR IMPROVING A PROGRESS MONITOR DURING A LONG COMPUTER PROCESS

(75) Inventors: Steven L Webb, Loveland, CO (US); Eugene W Pakenham, Greeley, CO (US); Martha A Chavez, Greeley, CO (US); Jeffrey P Lee, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 492 days.

(21) Appl. No.: 09/234,255

(22) Filed: Jan. 20, 1999

(51) Int. Cl.[7] .............................................. G09G 5/00
(52) U.S. Cl. ..................................... 715/772; 715/809
(58) Field of Search ............................. 345/658, 659, 345/702, 701, 772, 809

(56) References Cited

U.S. PATENT DOCUMENTS

| | | | | |
|---|---|---|---|---|
| 5,185,606 | A | * | 2/1993 | Verbaarschot et al. ....... 340/961 |
| 5,623,590 | A | * | 4/1997 | Becker et al. ............... 345/772 |
| 5,801,953 | A | * | 9/1998 | Thoma et al. ............... 345/832 |
| 5,805,166 | A | * | 9/1998 | Hall, Jr. et al. ............. 345/839 |
| 5,812,133 | A | * | 9/1998 | Schultz et al. .............. 345/809 |
| 5,859,640 | A | * | 1/1999 | de Judicibus ............... 345/710 |
| 5,995,079 | A | * | 11/1999 | Sheasby et al. ............. 345/856 |
| 6,038,588 | A | * | 3/2000 | Nagarajayya et al. ....... 709/102 |
| 6,097,390 | A | * | 8/2000 | Marks .......................... 345/772 |
| 6,275,987 | B1 | * | 8/2001 | Fraley et al. ................. 717/11 |
| 6,292,184 | B1 | * | 9/2001 | Morgan ....................... 345/970 |
| 6,293,801 | B1 | * | 9/2001 | Jenkins et al. .............. 434/236 |
| 6,337,699 | B1 | * | 1/2002 | Nielson ....................... 345/837 |
| 6,405,131 | B1 | * | 6/2002 | Barton ......................... 701/211 |

FOREIGN PATENT DOCUMENTS

JP          09235443          5/1998  .......... G06F 17/00

OTHER PUBLICATIONS

Russel Borland, "Microsoft Outlook 97", 1997, Microsoft Press, pp. 21-34.*
Robert Cowart. "Mastering Windows 3.1", 1993, Sybex, pp. 503-532.*
"Stopwatch Pointer: A Dynamic Progress Indicator"; IBM Technical Disclosure Bulletin, IBM Corp, New York, US; vol. 35; No. 1B; Jun. 1992; pp. 469-471.
"Data Base Progress Indicator"; IBM Technical Disclosure Bulletin; IBM Corp, New York, US; vol. 37; No. 2A; Feb. 1994; p. 341.
"Windows 95 Common Controls"; Dr. Dobb's Journal; M&T Publ.; Redwood City, CA, US; vol. 20; No. 5, May 1995; pp. 52, 54-56, 58, 60-63.

* cited by examiner

Primary Examiner—Kristine Kincaid
(74) Attorney, Agent, or Firm—Steven L. Webb

(57) ABSTRACT

An improved progress monitor or progress dialog box for a computer system that uncovers or reveals information as the progress bar indicates progress in addition to changing the colors or shades of the progress bar. The information displayed can be the text of a story, the punch line of a joke, or any other information that can inform or entertain the user.

10 Claims, 2 Drawing Sheets

METHOD AND APPARATUS FOR IMPROVING A PROGRESS MONITOR DURING A LONG COMPUTER PROCESS

FIELD OF THE INVENTION

The present invention relates generally to the field of computers and more particularly to a system and method that makes the time required for a computer process seem to go by more quickly.

BACKGROUND OF THE INVENTION

Optical scanners are used to capture and digitize images. For example, an optical scanner can be used to capture the image of printed matter on a sheet of paper. The digitized image can then be electronically stored and/or processed with character recognition software to produce ASCII text. Most optical scanners use illumination and optical systems to illuminate the object and focus a small area of the illuminated object, usually referred to as a "scan line," onto the photosensor array. The entire object is then scanned by sweeping the illuminated scan line across the entire object, either by moving the object with respect to the illumination and optical assemblies or by moving the illumination and optical assemblies relative to the object.

Currently, optical character recognition (OCR) requires 300 ppi-sampling rates for accurate results. Thus, a 300 ppi 4 bit gray scan (8.5×11), is approximately 4.2 Megabytes of data. A scanner that has an exposure time of 5 milliseconds will take about 16.5 seconds to scan an 8.5×11 inch page at 300 ppi. This scan time can be only part of the time required for the total process to be completed. The OCR process takes time as well as saving the data onto the hard disk of the host computer. The total time for a scan can range from 10 to 20 seconds up to over a minute depending on the type of scan, the speed of the host computer, and the amount of post processing done on the scanned data. During these processes the scanning or OCR software on the host computer usually displays a progress monitor or progress dialog box.

A progress monitor or progress dialog box is typically a small rectangular area on the screen that includes a title and a long rectangular area (the progress bar) that shows how much of the process is complete. The title is typically a description of the process. For example, "scanning the page" or "converting to text." The progress bar shows the progress by "filling" the area with a different shade or color. Thus, when the process is one third done the progress bar will be one third of one color or shade, and two thirds of the original color or shade. When the progress bar has filled or completely changed colors or shades it is an indication that the process has been completed. The progress monitor may also have a text indication of the percentage of the task that has been completed. For example, the progress dialog box may display "46%" just above the progress bar when the process is almost half completed (see FIG. 1).

During the time the progress bar is filling, the host computer is busy transferring data or processing data, which limits the amount of interaction that is allowed for the user. Thus the user can sit and watch for 10 seconds or up to over a minute. Accordingly, it would be desirable to provide the user with some form of information or entertainment to help pass the time. There is a need for an improved progress monitor.

SUMMARY OF THE INVENTION

The above and other aspects of the present invention are accomplished in a progress monitor that uncovers or reveals information as the progress bar indicates progress instead of just changing colors or shades.

DETAILED DESCRIPTION OF THE PREFERRED EMBODIMENT

Figure 1:
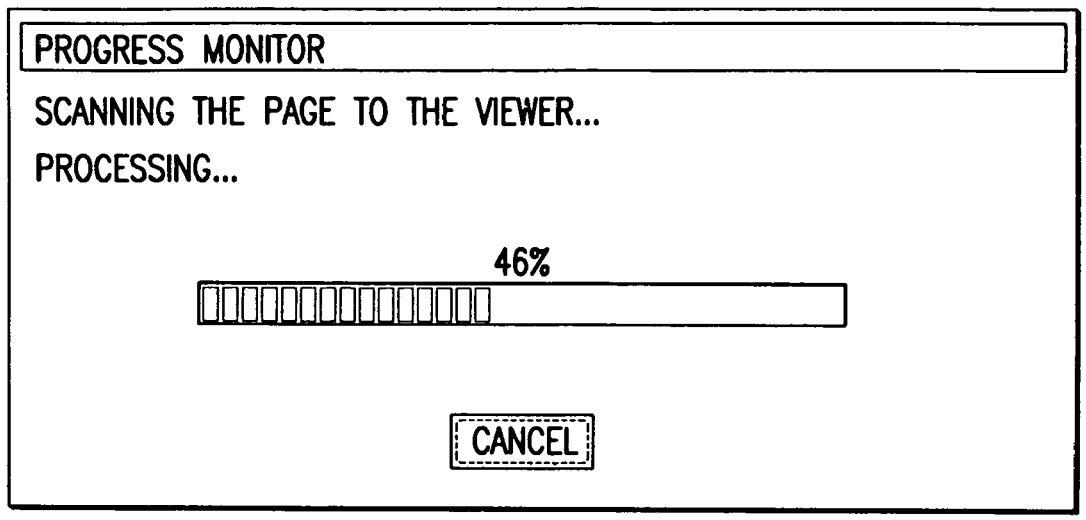
FIG. 1 is an image of a computer screen showing a typical progress monitor.
Figure 2:
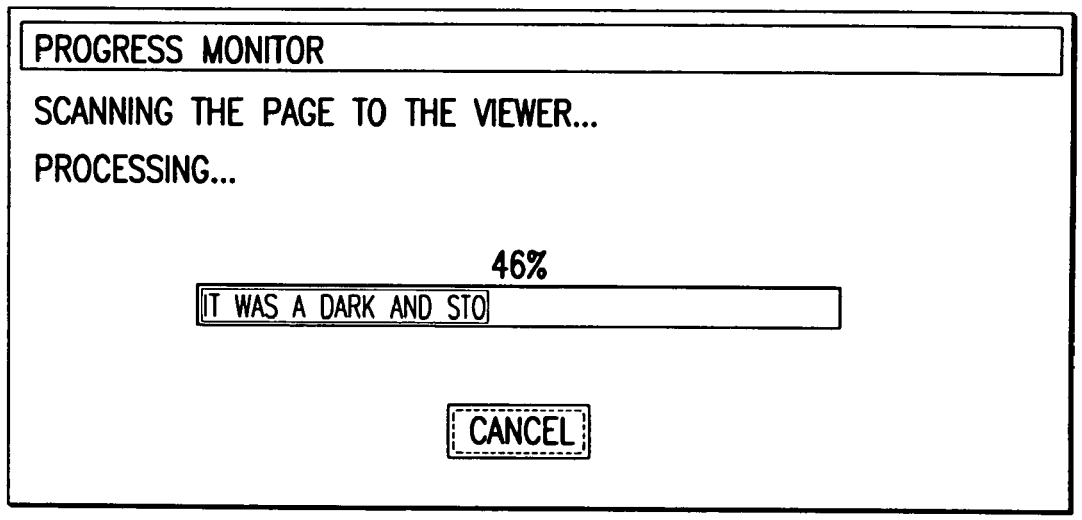
FIG. 2 is an image of a computer screen showing a progress monitor that has information being revealed, in accordance with the present invention, as the process progresses.

A progress dialog box or progress monitor can be improved by uncovering or revealing information by the movement of the progress bar, as the process completes (see FIG. 2). In the preferred embodiment the information that is uncovered is the next line in the text of a story. The program would keep track of which line in the story has been displayed and would increment a counter such that the next line after the line previously displayed in the story would be the line uncovered during the next process. When the entire story has been displayed over multiple processes a new story could be loaded. However, as those skilled in the art will readily appreciate, this invention is not limited by having the information that is uncovered be a line in a story.

The information could be anything that a user could find interesting or entertaining. For example, the current price of a stock could be displayed, or a weather report could be displayed. The information could be the punch line of a joke, with the main part of the joke displayed as text in the dialog box. The information could be the answer to a trivia question, with the trivia question displayed above the progress bar. The information could be a tip on how to use a feature of the software displaying the progress monitor. The information that is uncovered is also not limited to text. The information could be a video or image.

Figure 3:
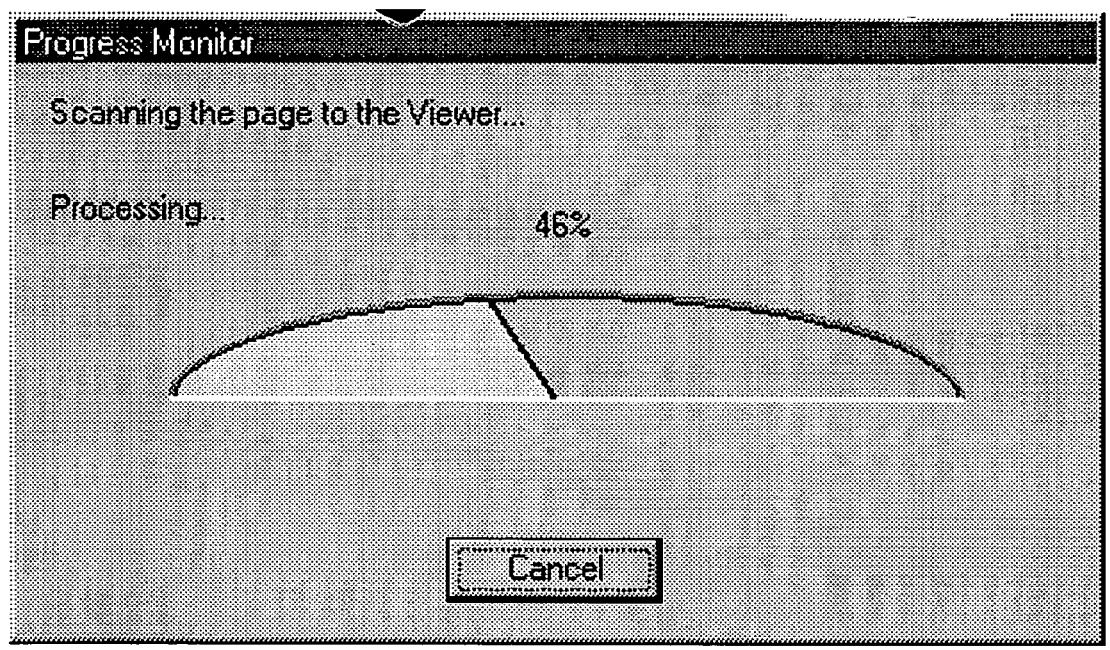
FIG. 3 is an image of a computer screen showing a progress monitor that uses angular motion to indicate progress.

As those skilled in the art will readily appreciate, the process that is monitored is not limited to a scan. It could be any process that takes time on a computer. For example, when installing software onto a computer, a progress monitor is used to indicate how much of the software has been installed. As those skilled in the art will readily appreciate, the progress bar is not limited in shape to a rectangle. The motion used to indicate progress is not limited to a linear motion. The motion used to indicate progress could also be an angular motion (see FIG. 3).

The advantages of this invention is that it gives the user something to do during a process other than just watching the progress monitor fill with a different color or shade. By entertaining or educating the user, the time to complete the process being monitored seems to pass more quickly.

A progress bar that reveals text as it changes colors can be created by first defining a rectangle and choosing two colors or shades, for example black and white. The rectangle or progress bar will initially be painted or filled with only one of the colors. As the process being monitored progresses from zero to 100%, a point along the length of the rectangle corresponding to the amount of progress can be defined. For example, when the process is 30% complete the position of the point would be 30% along the length of the rectangle. Each time the progress of the process is updated the point would move along the length of the rectangle. The rectangle or progress bar is painted with one color starting at one end of the rectangle up to the position of the point. The other color is used to paint the rectangle from the position of the point to the opposite end of the rectangle. As the point moves from one end of the rectangle to the opposite end the rectangle will change from one color to the other color. The text or information to be revealed will be displayed in the rectangle using the color or shade that initially fills the rectangle. For example, when the rectangle is initially filled with black, the text or information will be displayed in black. When black text is displayed on a black background the text can not be seen. As the color of the rectangle changes from black to white the black text is revealed and made visible. Appendix A contains the code for a program that defines a black and white brush, defines a rectangle, defines an edge in the rectangle that corresponds to the progress of a process, paints the rectangle up to the edge with the white brush, paints the rectangle from the edge to the end with the black brush, and then displays text in the rectangle with the black brush.

A progress monitor does not need to change colors or shades but could instead move a mark or line to indicate the amount of the process that has been completed. Changing colors or shades to indicate the progress is the preferred method.

What is claimed is:

1. A progress monitor comprising:
   a progress area used to indicate the progress of a process being monitored;
   a progress indicator that progressively divides the progress area into a first part of the progress area and a second part of the progress area, where the first part of the progress area corresponds to the amount of completion of the process being monitored;
   information, in addition to the progress of the process, progressively becoming visible in the first part of the progress area as the first part of the progress area becomes larger.

2. The progress monitor of claim 1 where the progress area is a rectangle.

3. The progress monitor of claim 1 where the progress area is a half circle.

4. The progress monitor of claim 1 where the progress area is a half ellipse.

5. The progress area of claim 1 where the first part of the progress area is a first color and the second part of the progress area is a second color and the progress indicator is defined by the change in color between the first part of the progress area and the second part of the progress color.

6. The progress monitor of claim 1 where the progress indicator is a line dividing the first part of the progress area from the second part of the progress area.

7. The progress monitor of claim 1 where the information being uncovered is the next line of text in a story.

8. The progress monitor of claim 1 where the motion of the progress indicator is linear.

9. The progress monitor of claim 1 where the motion of the progress indicator is angular.

10. A method of revealing information by a progress monitor during the monitoring of a process comprising the steps of:
    a) defining a progress area;
    b) dividing the progress area into a first part and a second part where the first part of the progress area corresponds to the amount of completion of the process being monitored;
    c) moving the dividing point between the first part and the second part of the progress area as the process progresses
    d) progressively revealing information in the first part of the progress area, as the first part of the progress area becomes larger;
    e) repeating steps c and d until the process being monitored has been completed.

* * * * *